United States Patent
Rainville

(10) Patent No.: US 11,152,631 B2
(45) Date of Patent: Oct. 19, 2021

(54) AIR-COOLED FUEL-CELL FREEZE-PROTECTION SYSTEM

(71) Applicant: Bell Helicopter Textron Inc., Fort Worth, TX (US)

(72) Inventor: Joseph D. Rainville, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 297 days.

(21) Appl. No.: 16/435,546

(22) Filed: Jun. 9, 2019

(65) Prior Publication Data

US 2020/0388865 A1    Dec. 10, 2020

(51) Int. Cl.
| | |
|---|---|
| *H01M 8/04223* | (2016.01) |
| *B64C 39/02* | (2006.01) |
| *B64D 41/00* | (2006.01) |
| *H01M 8/04014* | (2016.01) |
| *H01M 8/04007* | (2016.01) |
| *H01M 8/04701* | (2016.01) |
| *H01M 8/04992* | (2016.01) |

(52) U.S. Cl.
CPC ....... *H01M 8/04253* (2013.01); *B64C 39/024* (2013.01); *B64D 41/00* (2013.01); *H01M 8/04014* (2013.01); *H01M 8/04037* (2013.01); *H01M 8/04074* (2013.01); *H01M 8/04731* (2013.01); *H01M 8/04992* (2013.01); *B64C 2201/02* (2013.01); *B64C 2201/042* (2013.01); *B64D 2041/005* (2013.01); *H01M 2250/20* (2013.01)

(58) Field of Classification Search
None
See application file for complete search history.

(56) References Cited

U.S. PATENT DOCUMENTS

2017/0125831 A1*   5/2017   Gasner ............. H01M 8/04201

FOREIGN PATENT DOCUMENTS

KR       20170014295 A   *   2/2017   ............. H01M 8/04

OTHER PUBLICATIONS

Machine Translation KR20170014295(A) (Year: 2017).*

* cited by examiner

*Primary Examiner* — Victoria H Lynch
(74) *Attorney, Agent, or Firm* — Lightfoot & Alford PLLC

(57) ABSTRACT

An air-cooled fuel-cell freeze-protection system for a rotor-craft using a controller to vary a heating system for an air-cooled fuel cell. The heating system heats supply air for the air-cooled fuel cell, and a butterfly valve varies a pressure of the supply air to the air-cooled fuel cell. The heating system can be an electric heater, a heat exchanger, or a combination of heater and heat exchanger.

15 Claims, 10 Drawing Sheets

AIR-COOLED FUEL-CELL FREEZE-PROTECTION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Fuel cells can provide power for drones without harmful emissions. Fuel cells should operate in a range of temperatures from 5° C. to 50° C. to maximize efficiency. Air-cooled fuel cells are better suited for airborne drone usage because air-cooled fuel cells are smaller and lighter than fuel cells that are liquid cooled. A limitation of air-cooled fuel cells is that they require heated air to operate in freezing conditions.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Air-cooled fuel cells require a benign supply of air to be efficient power supplies for aircraft. Using air-cooled fuel cells in aircraft requires supply air that has been conditioned to preclude freezing the fuel cell. This disclosure describes an air-cooled fuel-cell freeze-protection system configured to provide warmth and pressure to an airborne air-cooled fuel cell in order to allow aircraft to operate in cold and high-altitude conditions.

Figure 1:
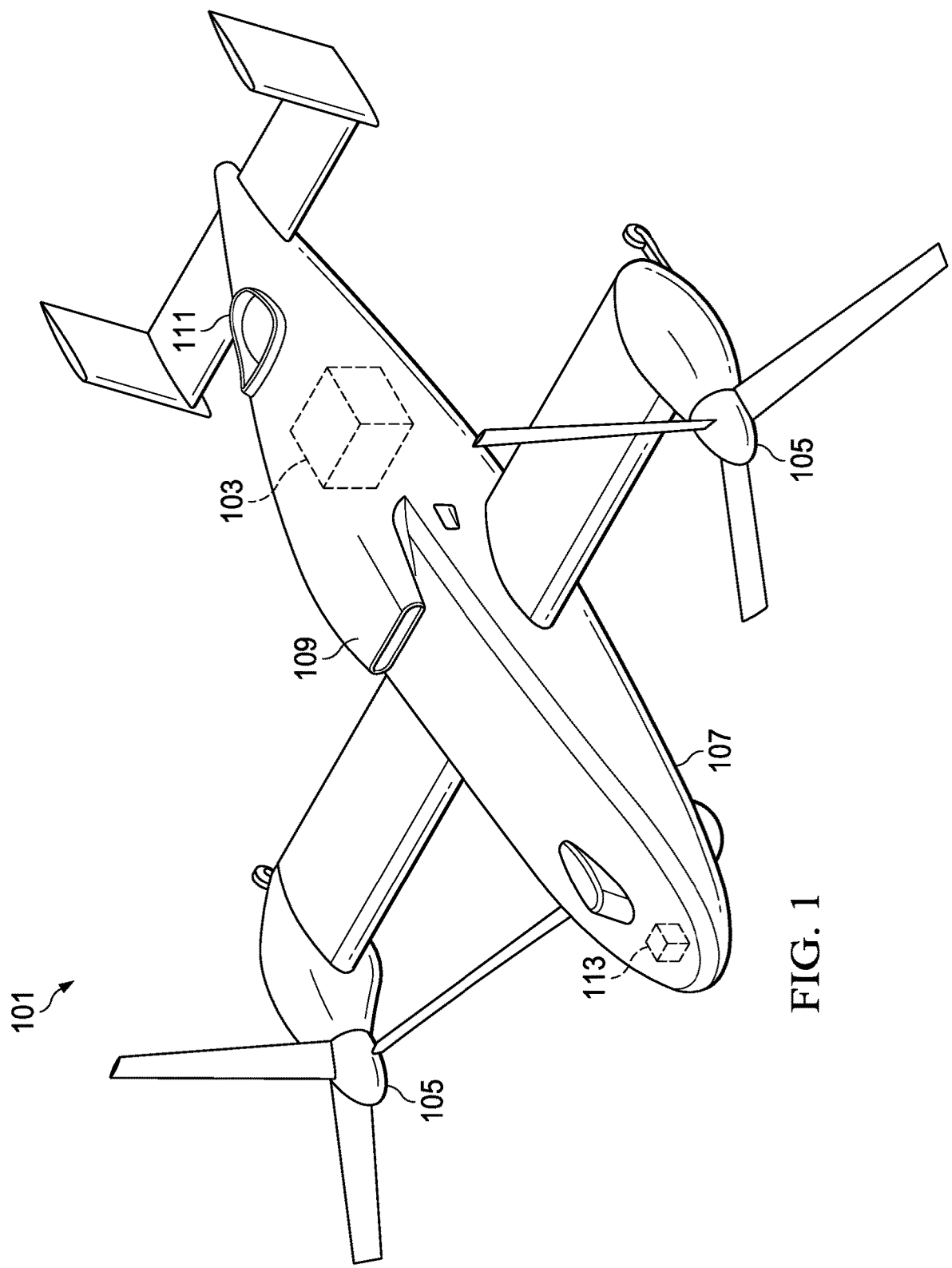
FIG. 1 is an oblique view of a drone incorporating an air-cooled fuel-cell freeze-protection system according to this disclosure.

FIG. 1 illustrates a rotorcraft 101 equipped with an air-cooled fuel cell 103 according to this disclosure. Rotorcraft 101 comprises rotor systems 105 configured to be driven by electric motors and coupled to a fuselage 107. Rotorcraft 101 further comprises at least one inlet duct 109 carried by the fuselage 107, a bypass outlet 111, and an altimeter 113. Supply air enters the at least one inlet 109 during the flight of rotorcraft 101 and is passed through a heating system (not shown) before passing through the air-cooled fuel cell 103 and then ejected from the rotorcraft 101 through outlet 111. Fuel cell 103 is a proton-exchange membrane fuel cell and comprises layers of membranes sandwiched between flow plates. Supply air flows through the fuel cell 103 to provide the fuel cell oxygen for the reaction. When the air-cooled fuel cell 103 requires heating, then the supply air to the fuel cell 103 is heated by a heat exchanger (not shown), an electric heater (not shown), or both. In addition to the illustrated rotorcraft 101, additional aerospace applications of the air-cooled fuel cell freeze protection system may include; drones, helicopters, VTOL aircraft, passenger/cargo propeller or jet aircraft, whether for civilian or military use. Typically, air entering the at least one inlet 109 is ram air from either the rotor system 105 or from air flow resulting from flight of the rotorcraft 101.

Figure 2:
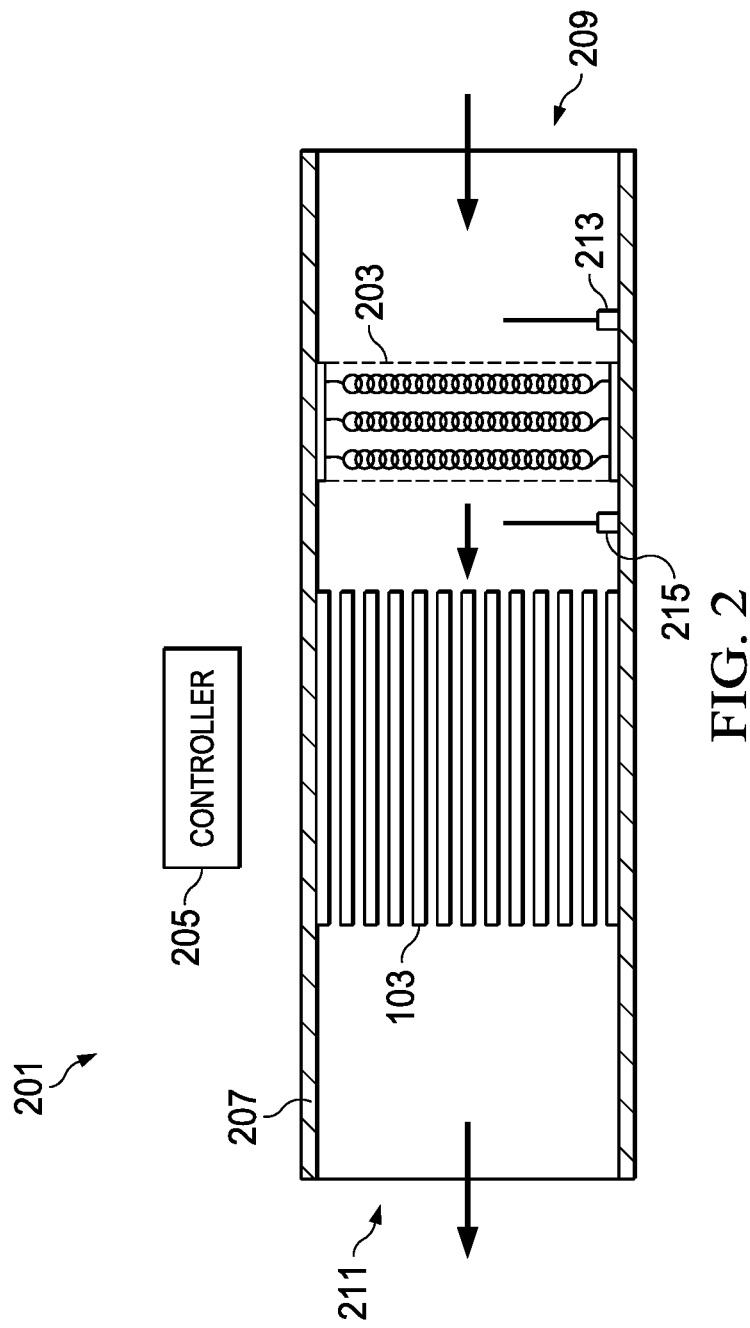
FIG. 2 is a cross-sectional view of an air-cooled fuel-cell freeze-protection system according to this disclosure.

FIG. 2 illustrates an air-cooled fuel cell system freeze protection 201 according to this disclosure. System 201 comprises a fuel cell 103, an electric heater 203, a controller 205, a duct 207, an inlet 209, an outlet 211, an inlet thermocouple 213, and a fuel cell thermocouple 215. Controller 205 is electrically wired (not shown) to the heater 203 and the thermocouples 213, 215. Controller 205 selectively controls operation of the electric heater 203 to vary a temperature of the air passing out of electric heater 203.

As supply air enters the inlet 209 of duct 207, the inlet thermocouple 213 measures an ambient temperature and provides that data to the controller 205. If the controller 205 determines the ambient temperature of the inlet 209 is below the required temperature of the fuel cell 103, then the controller 205 activates the heater 203 to raise a temperature of supply air flowing into the fuel cell 103 until the fuel cell thermocouple 215 detects supply air at a sufficient temperature for the fuel cell 103 to operate efficiently. For example, if a temperature of the inlet 209 as measured by the inlet thermocouple 213 is 0° C., then the heater 203 may operate until the fuel cell thermocouple 215 detects a 5° C. temperature. The heater 203 can be cycled on and off by various methods to maintain the inlet air at a selected temperature. While the fuel cell thermocouple 215 is illustrated as being located between the fuel cell 103 and the heater 203, the fuel cell thermocouple 215 may be located interior to the fuel cell 103.

Figure 3:
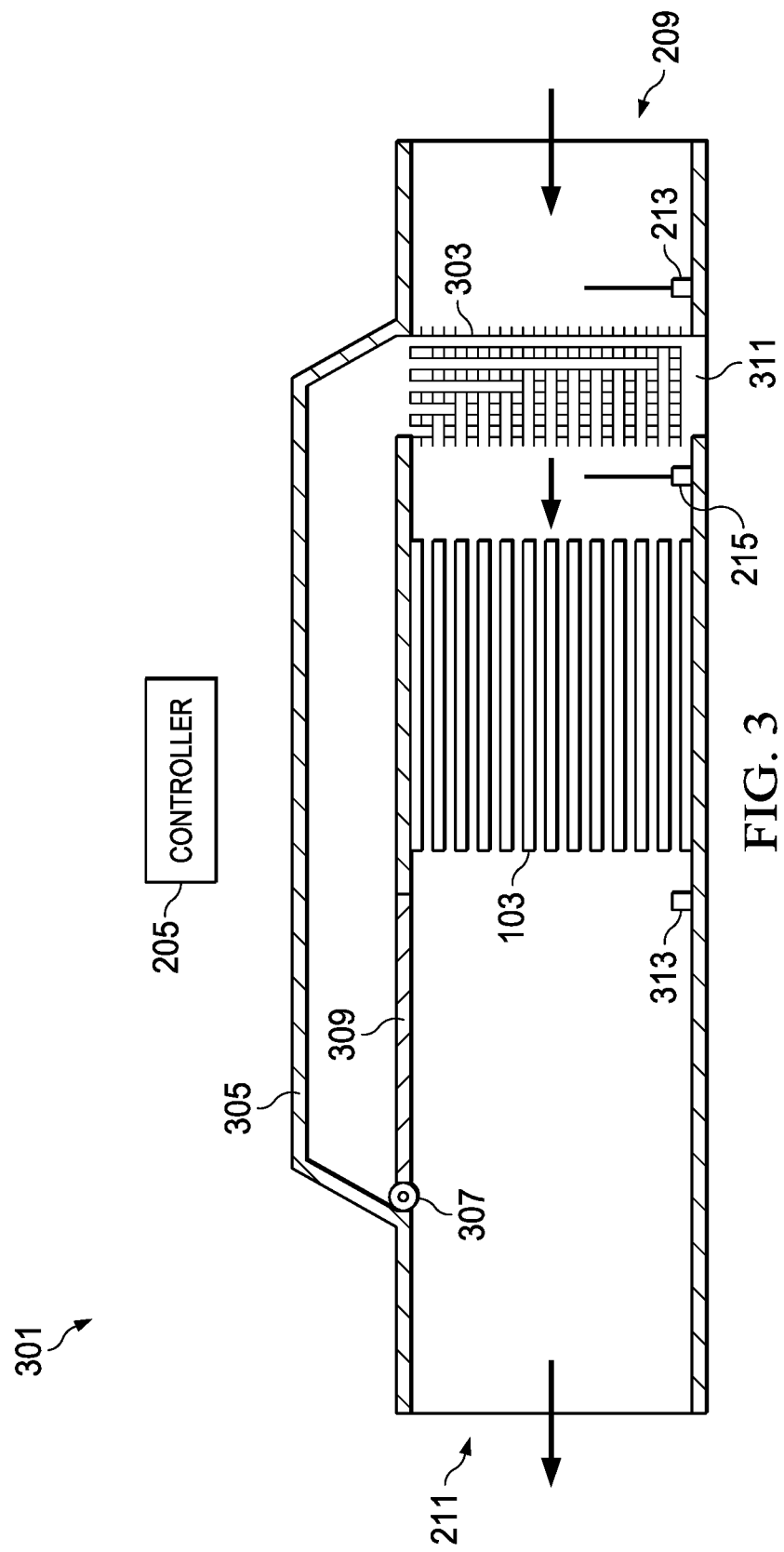
FIG. 3 is a cross-sectional view of another air-cooled fuel-cell freeze-protection system in a non-bypassed non-heated state according to this disclosure.
Figure 4:
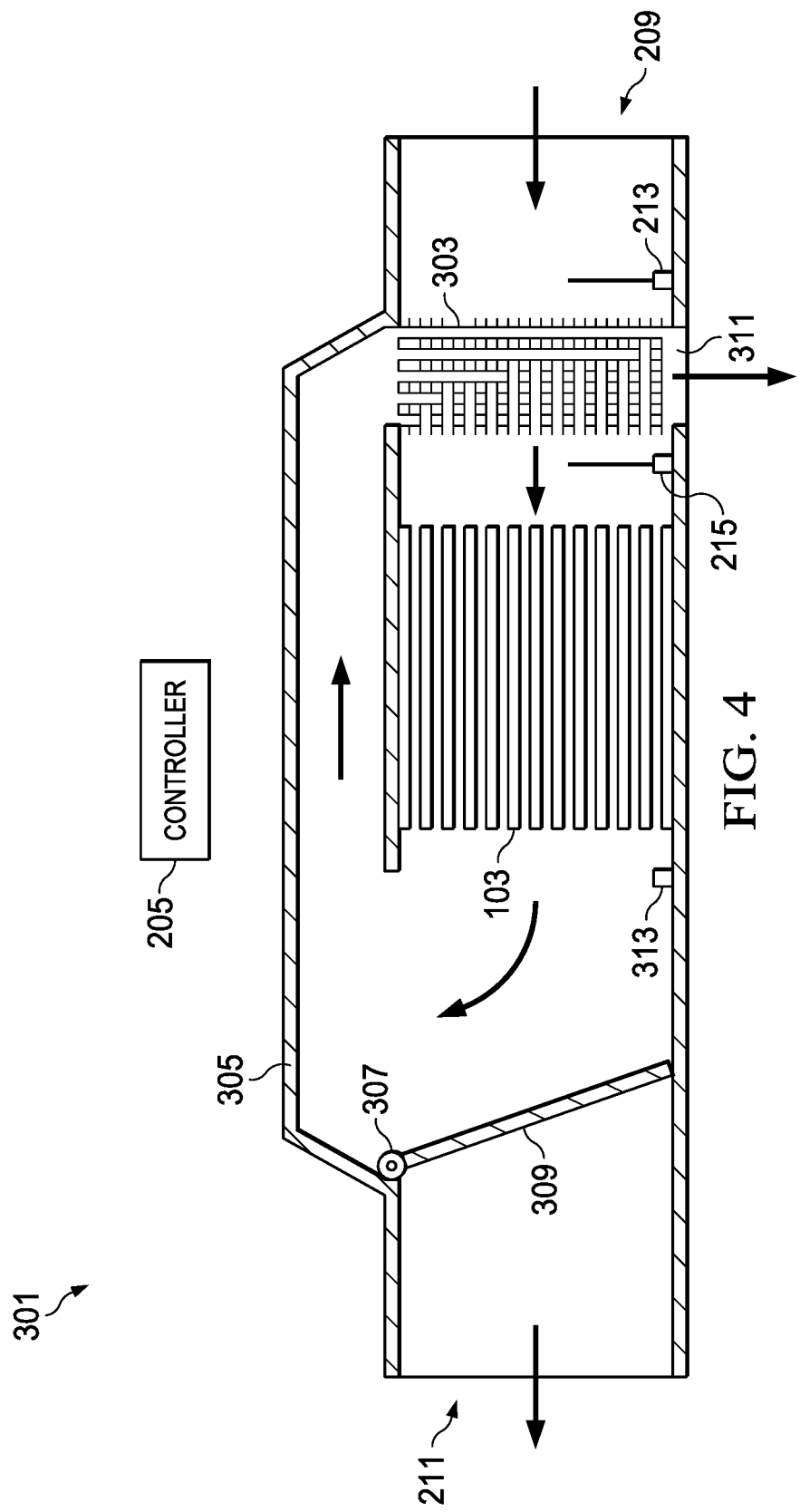
FIG. 4 is a cross-sectional view of the system of FIG. 3 in a bypassed heated state according to this disclosure.
Figure 5:
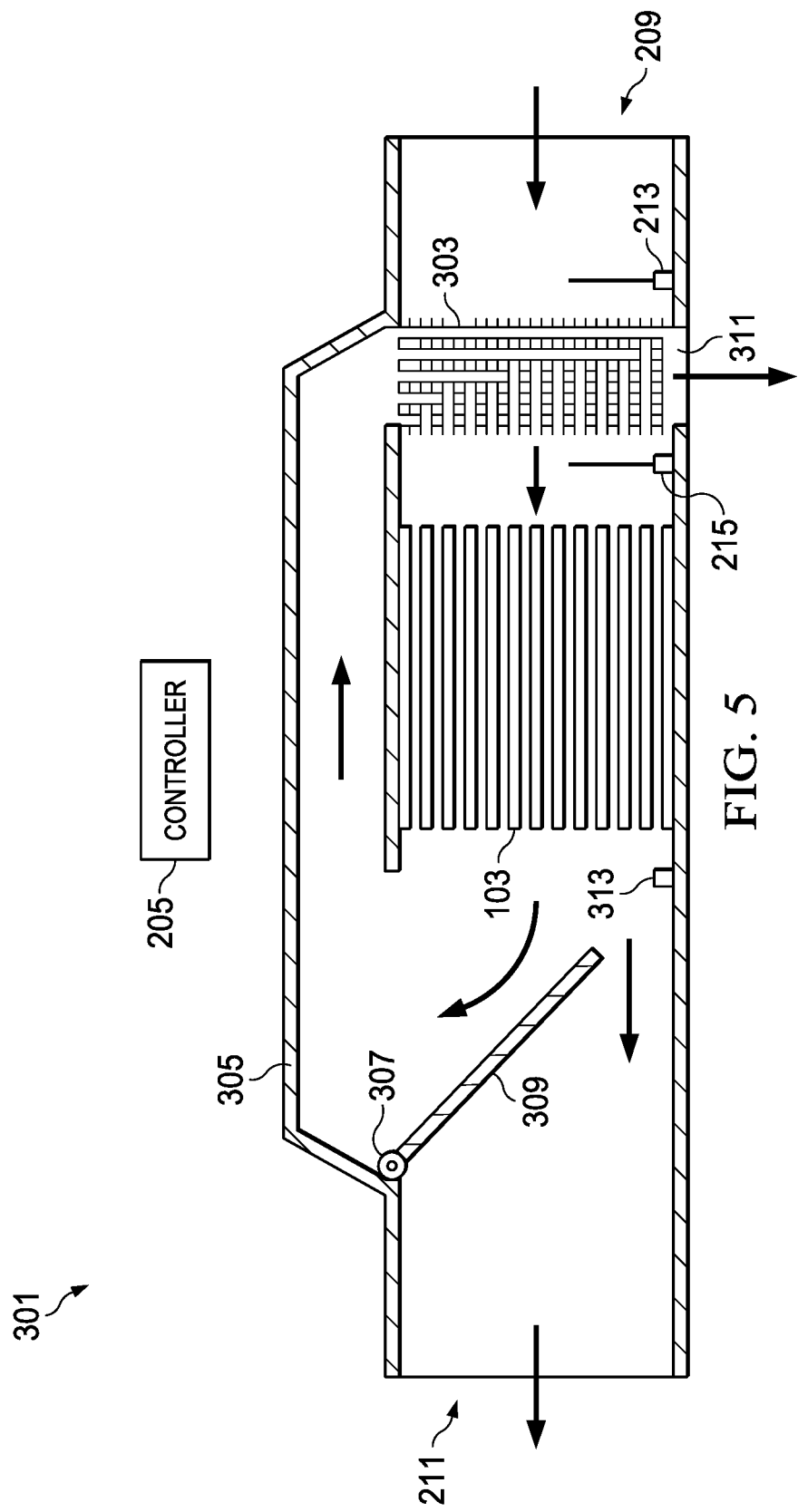
FIG. 5 is a cross-sectional view of the system of FIG. 3 in a partially bypassed heated state according to this disclosure.

The temperature and the density of air decreases as altitude increases. Rotorcraft using air-cooled fuel cells need a conditioned supply air to operate in cold conditions and higher altitudes. FIGS. 3-5 illustrate another air-cooled fuel cell system freeze protection system 301 according to this disclosure. System 301 comprises the same elements as system 201 without the heater 203. System 301 further comprises a heat exchanger 303, a heat-exchanger duct 305, an actuator 307, a heat-exchanger door 309, a heat-exchanger exhaust 311, and a pressure transducer 313. Controller 205 is electrically wired (not shown) to the actuator 307 to pivot the heat-exchanger door 309 as needed to heat and pressurize the supply air of the fuel cell 103.

FIG. 3 illustrates system 301 in a state where supply air is not heated. Air enters inlet 209 and passes through the heat exchanger 303, the fuel cell 103, and out of outlet 211. The heat exchanger 303 in FIG. 3 will not raise an air temperature of the supply air because heat-exchanger door 309 is in a closed position and excess heat from the fuel cell 103 is ejected from the outlet 211.

FIG. 4 illustrates system 301 in a state where supply air is fully heated. Air enters inlet 209 and passes through the heat exchanger 303, the fuel cell 103, the heat-exchanger duct 305, through the heat exchanger 303 a second time, and out of heat-exchanger exhaust 311. The heat exchanger 303 in FIG. 4 will raise an air temperature of the supply air as much as possible because heat-exchanger door 309 is in a fully opened position and excess heat from the fuel cell 103 is thermally transmitted in the heat exchanger 303. The controller 205 can detect dropping air density with the altimeter 113. By varying temperature inside the fuel cell 103, the controller 205 also varies air pressure inside the fuel cell 103. The heat-exchanger duct 305 features an unequal and smaller cross-sectional area as compared to duct 207, therefore, pressure inside the fuel cell 103 rises as the air is forced into the duct 305. The controller 205 can measure an increase in air pressure at the fuel cell 103 via the pressure transducer 313.

FIG. 5 illustrates system 301 in a state where supply air is partially heated. Air enters inlet 209 and some is passed through the heat exchanger 303, the fuel cell 103, the heat-exchanger duct 305, through the heat exchanger 303 a second time, and out of heat-exchanger exhaust 311, and the rest is ejected from outlet 211. The heat exchanger 303 in FIG. 5 will raise an air temperature of the supply air a selected amount because heat-exchanger door 309 is in a partially opened position and excess heat from the fuel cell 103 is thermally transmitted in the heat exchanger 303 and also ejected from the outlet 211. Controller 205 selectively positions the heat-exchanger door 309 as needed to vary the temperature of fuel cell 103.

Figure 6:
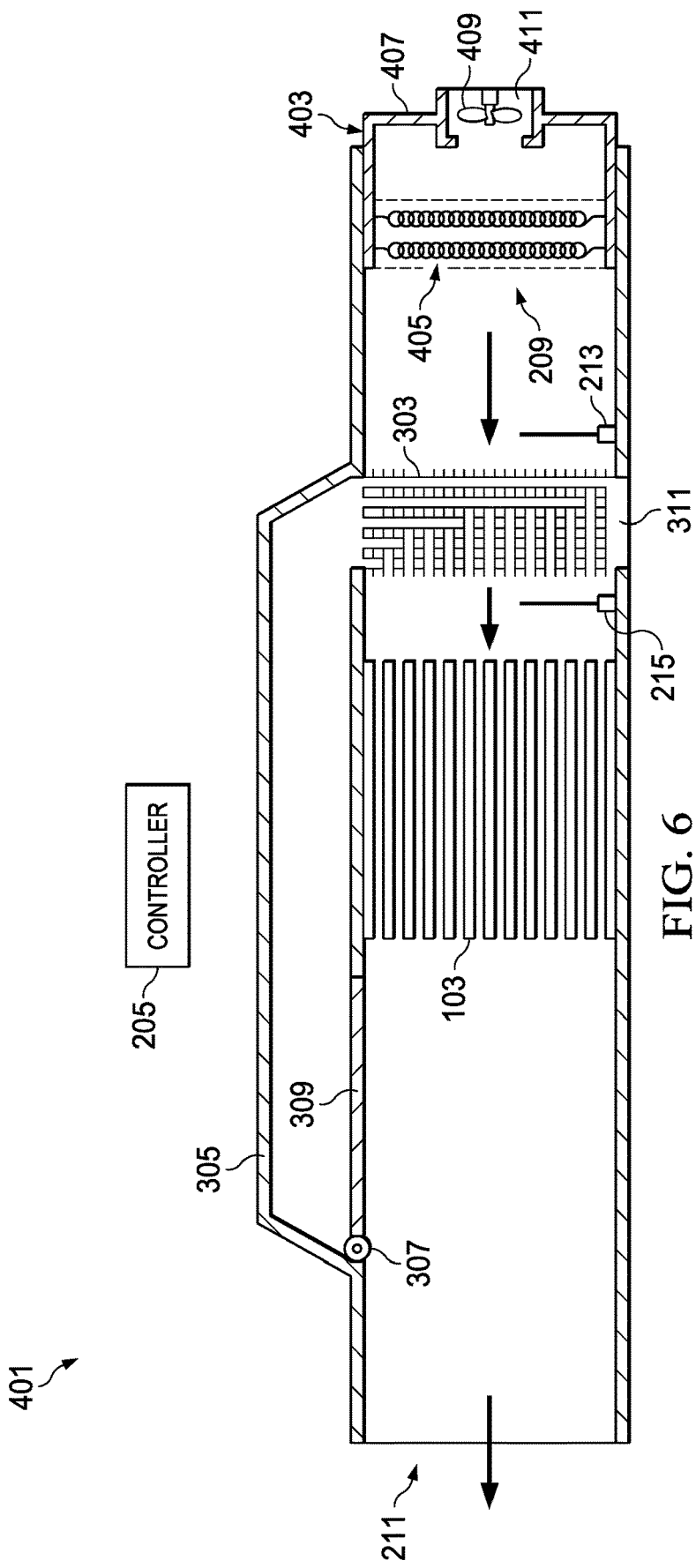
FIG. 6 is a cross-sectional view of another air-cooled fuel-cell freeze-protection system with an external heater in a non-bypassed heated state according to this disclosure.

FIG. 6 illustrates another air-cooled fuel cell system freeze protection system 401 according to this disclosure. System 401 comprises the same elements as system 301 but further comprises a detachable electric heater 403. Heater 403 comprises electric heating elements 405, a heater housing 407, and an electric fan 409. Heater 403 is configured for heating the air-cooled fuel cell 103 of the rotorcraft 101 for a period of time until a heat exchanger 303 is capable of heating supply air. Heater 403 is inserted into the inlet 209 and powered by the aircraft, a battery, or other suitable power supply. The heater housing 407 is configured to generally seal the inlet 209. The fan 409 draws air into the inlet 209 from opening 411 and across the heating elements 405. Because the heater 403 is removable, once the air-cooled fuel cell 103 is sufficiently warmed for operation, then the heater 403 is removed from the rotorcraft 101.

Figure 7:
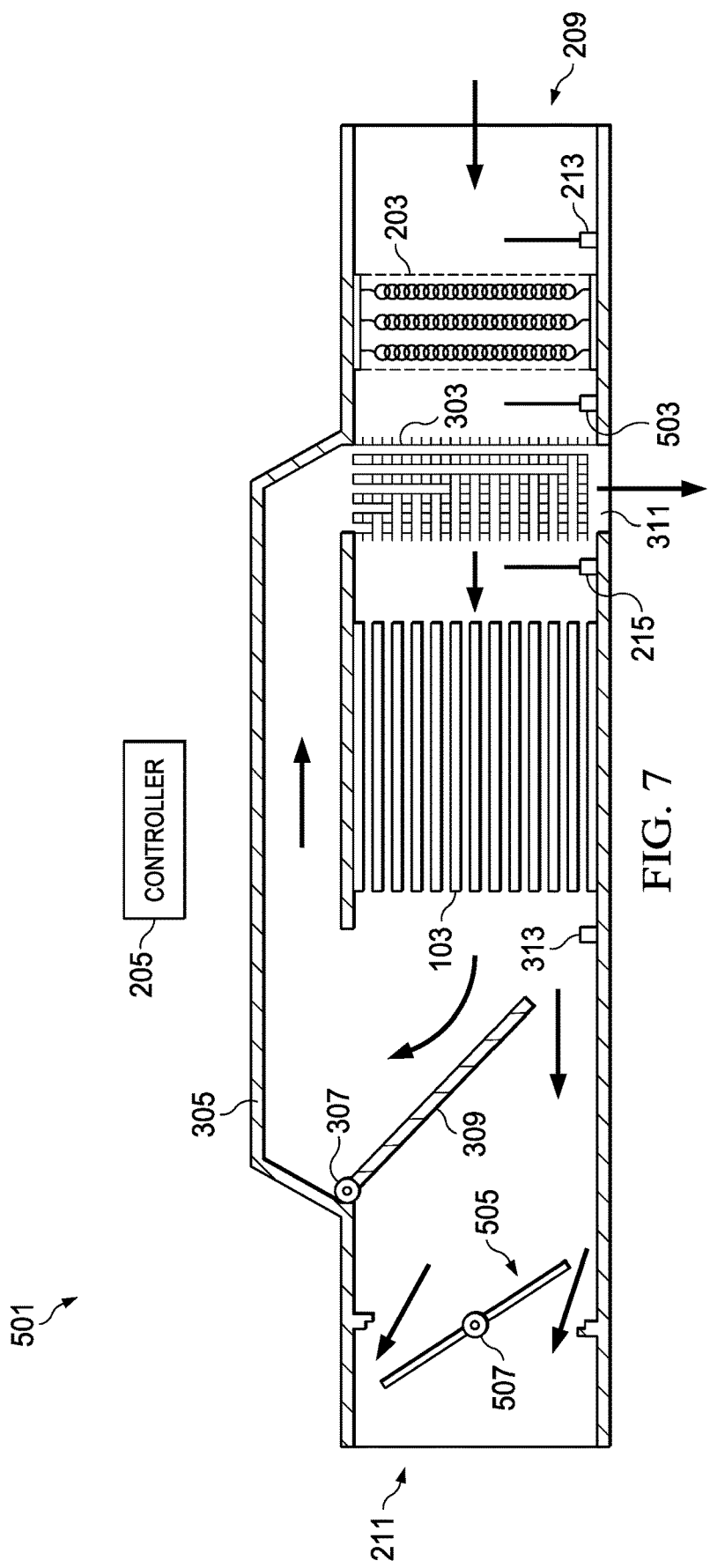
FIG. 7 is a cross-sectional view of another air-cooled fuel-cell freeze-protection system with a butterfly valve in a partially bypassed heated state according to this disclosure.

FIG. 7 illustrates another air-cooled fuel cell system freeze protection system 501 according to this disclosure. System 501 comprises the same elements as system 301 but further comprises a heater 203, a heater thermocouple 503, a butterfly valve 505, an actuator 507, and a pressure transducer 313. System 501 can correct for altitude with changes in pressure and temperature independent of each other, whereas system 301 corrected for altitude with changes in pressure and temperature concurrently. The combination of the heater 203 and the heat exchanger 303 enables system 501 to quickly and efficiently heat the fuel cell 103. The butterfly valve 505 enables system 501 to increase a pressure of the supply air.

Air enters inlet 209 and passes through the heater 203, the heat exchanger 303, the fuel cell 103, while some is diverted into the heat-exchanger duct 305, through the heat exchanger 303 a second time, and out of heat-exchanger exhaust 311, and the rest passes through the butterfly valve 505 and is ejected from outlet 211. The heat exchanger 303 in FIG. 7 will raise an air temperature of the supply air a selected amount because heat-exchanger door 309 is in a partially opened position and excess heat from the fuel cell 103 is thermally transmitted in the heat exchanger 303 and also ejected from the outlet 211. Controller 205 selectively positions the heat-exchanger door 309 as needed to vary the temperature of fuel cell 103. Additionally, controller 205 selectively activates heater 203 as needed to warm the fuel cell 103. Initially, the system 501 may operate heater 203 until fuel cell 103 is warmed and then operate the heat exchanger 303 as needed to maintain the fuel cell 103 in a heated state without using the heater 203.

Figure 8:
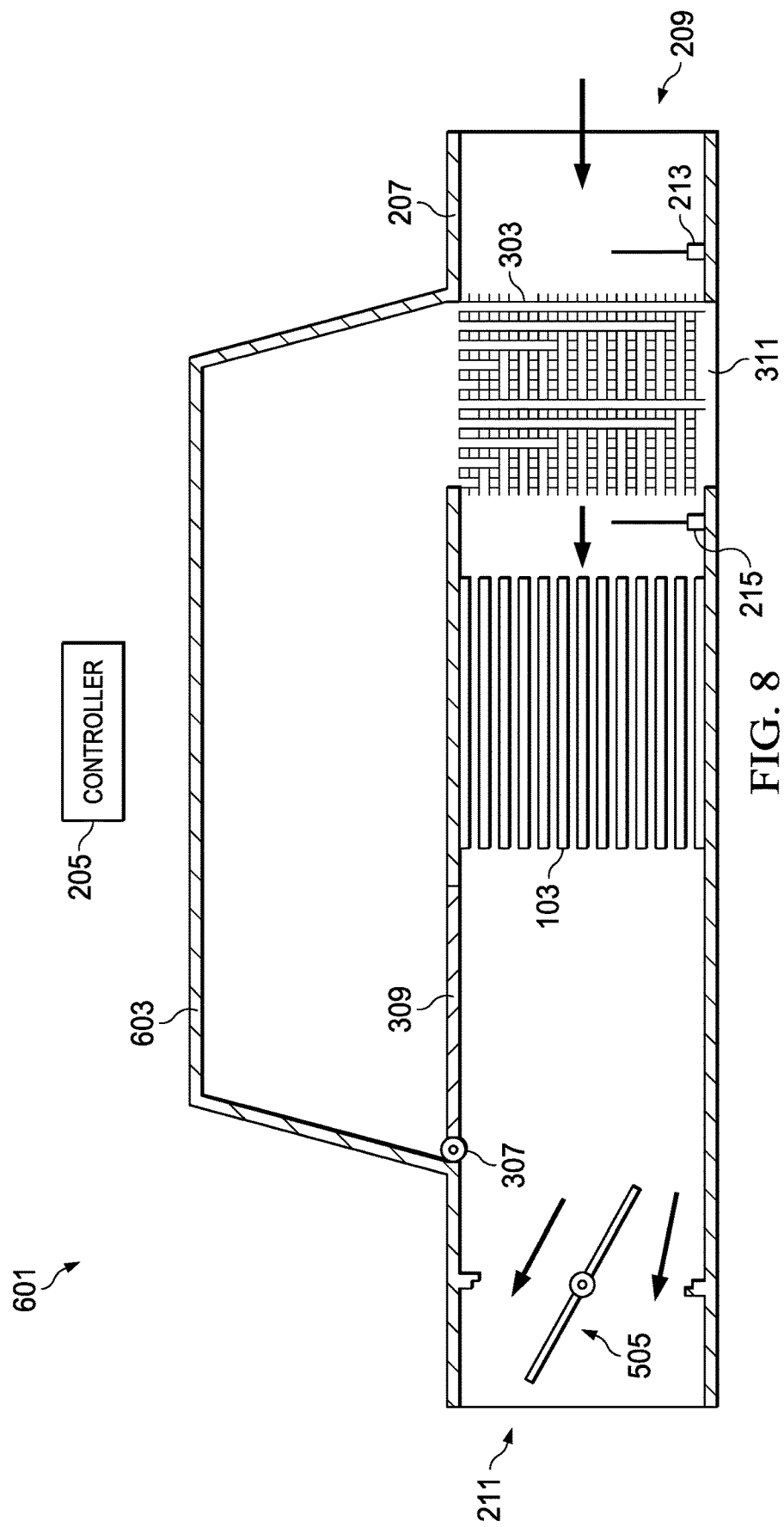
FIG. 8 is a cross-sectional view of another air-cooled fuel-cell freeze-protection system in a non-bypassed non-heated pressurized state according to this disclosure.
Figure 9:
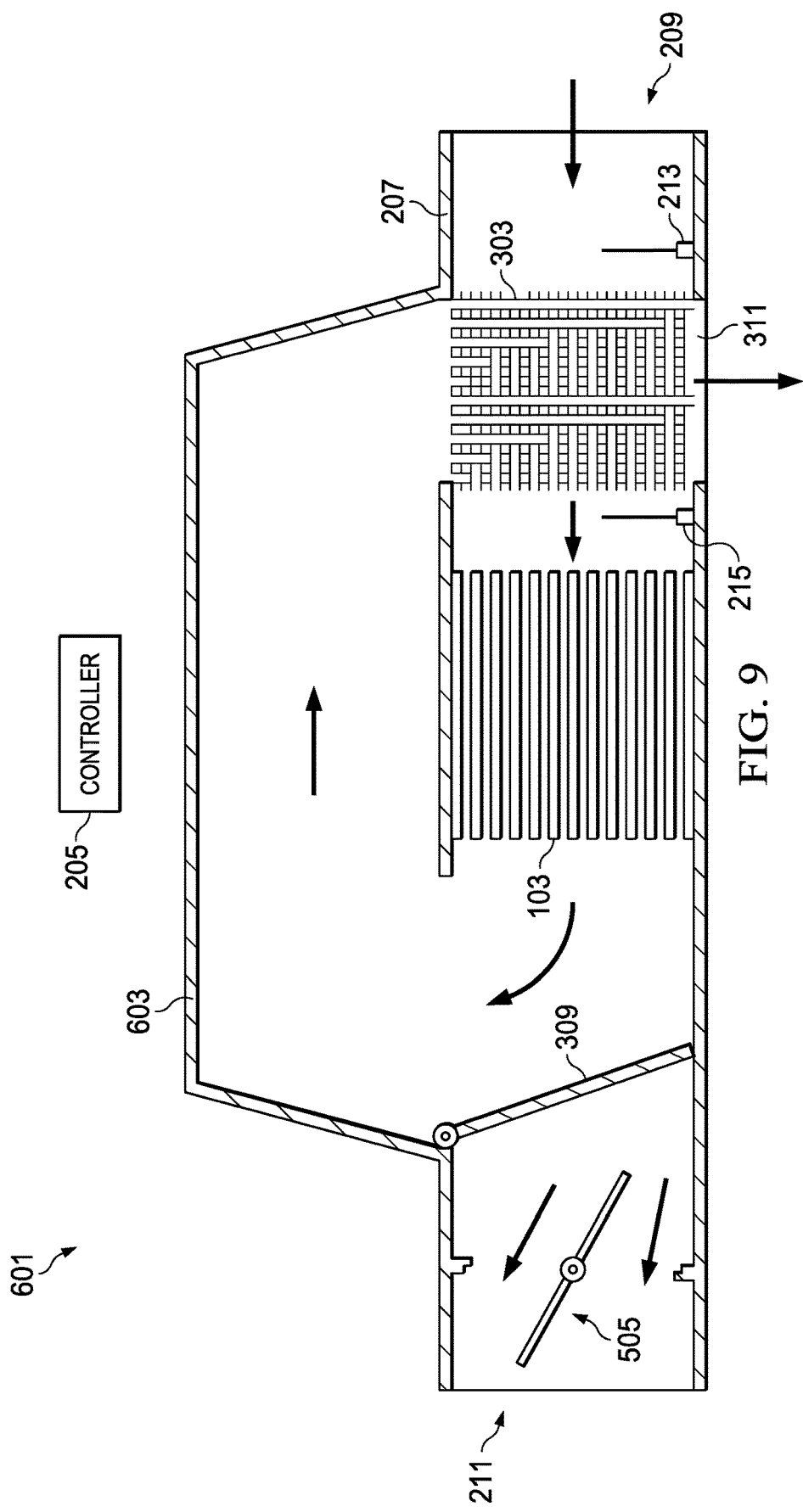
FIG. 9 is a cross-sectional view of the system of FIG. 8 in a bypassed heated non-pressurized state according to this disclosure.
Figure 10:
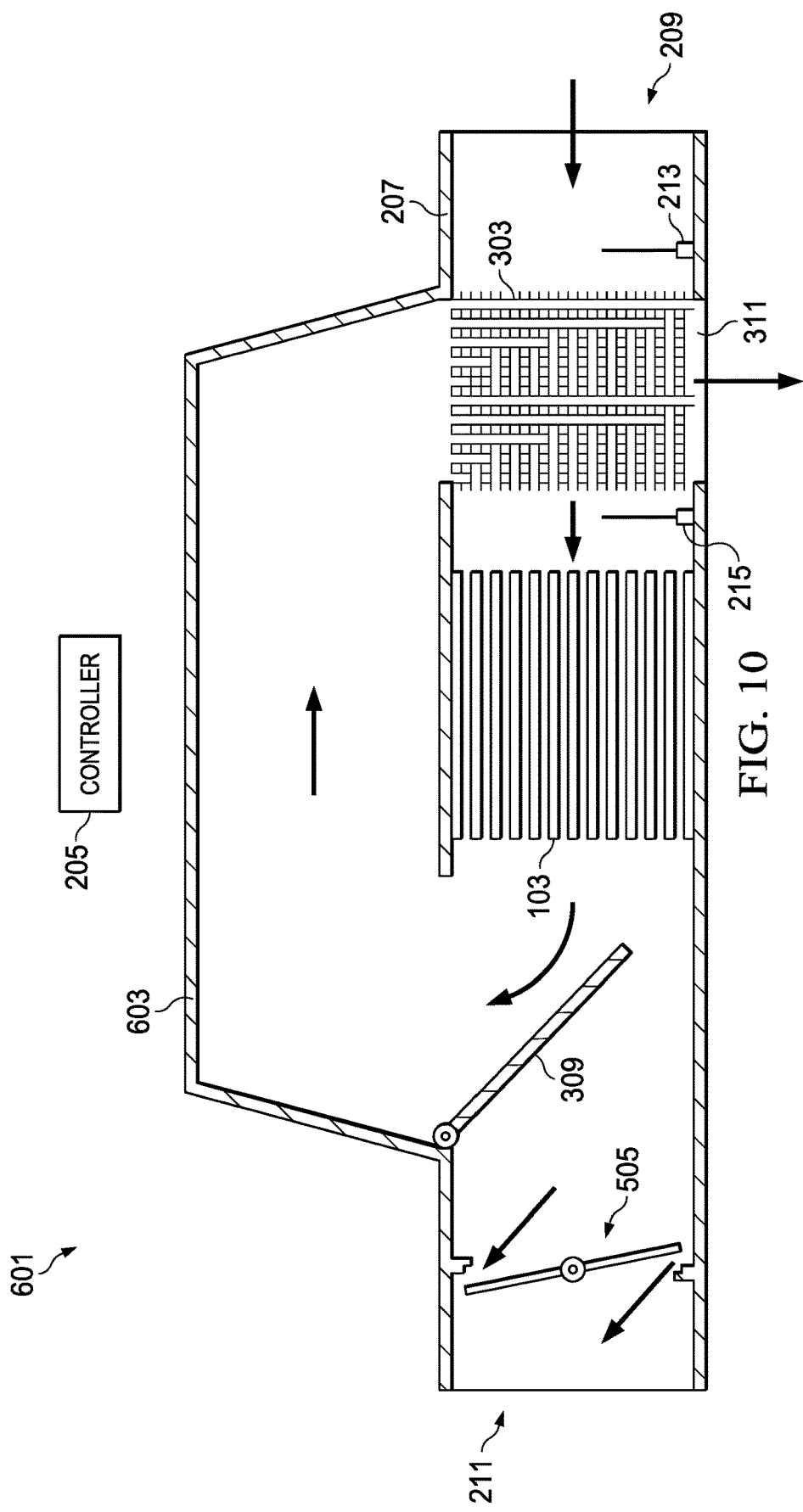
FIG. 10 is a cross-sectional view of the system of FIG. 8 in a partially bypassed heated pressurized state according to this disclosure.

FIGS. 8-10 illustrate another air-cooled fuel cell system freeze protection system 601 according to this disclosure. System 601 comprises the same elements as system 301, but further comprises a heat-exchanger duct 603, having a cross-sectional area equal to duct 207, instead of duct 305.

FIG. 8 illustrates system 601 in a state where supply air is pressurized but not heated. Air enters inlet 209 and passes through the heat exchanger 303, the fuel cell 103, the butterfly valve 505, and out of outlet 211. The heat exchanger 303 in FIG. 8 will not raise an air temperature of the supply air because heat-exchanger door 309 is in a closed position and excess heat from the fuel cell 103 is ejected from the outlet 211.

FIG. 9 illustrates system 601 in a state where supply air is fully heated but not pressurized. Air enters inlet 209 and passes through the heat exchanger 303, the fuel cell 103, the heat-exchanger duct 603, through the heat exchanger 303 a second time, and out of heat-exchanger exhaust 311. The heat exchanger 303 in FIG. 9 will raise an air temperature of the supply air as much as possible because heat-exchanger door 309 is in a fully opened position and excess heat from the fuel cell 103 is thermally transmitted in the heat exchanger 303. The controller 205 can detect dropping air density with the altimeter 113. The controller 205 also varies air pressure inside the fuel cell 103 by varying temperature inside the fuel cell 103. The heat-exchanger duct 305 features an equal cross-sectional area as compared to duct 207. Therefore, air pressure inside the fuel cell 103 does not rise as the air is forced into the duct 603.

FIG. 10 illustrates system 601 in a state where supply air is partially heated and pressurized. Air enters inlet 209, and some is passed through the heat exchanger 303, the fuel cell 103, the heat-exchanger duct 603, through the heat exchanger 303 a second time, and out of heat-exchanger exhaust 311, and the rest is ejected from outlet 211. The heat exchanger 303 in FIG. 10 will raise an air temperature of the supply air a selected amount because heat-exchanger door 309 is in a partially opened position and excess heat from the fuel cell 103 is thermally transmitted in the heat exchanger 303 and also ejected from the outlet 211. Controller 205 selectively positions the heat-exchanger door 309 as needed to vary the temperature of fuel cell 103. Controller 205 can measure an increase in air pressure at the fuel cell 103 via the pressure transducer 313. The butterfly valve 505 enables the system 601 to increase a pressure of the supply air by closing the valve 505.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An air-cooled fuel-cell freeze-protection system for a rotorcraft, comprising:
    a controller;
    an air-cooled fuel cell configured to be provided supply air from an inlet duct of the rotorcraft; and
    a heating system configured to heat the supply air and comprising:
        a heat exchanger;
        a heat-exchanger duct; and
        a heat-exchanger door;
    wherein the heat exchanger is heated from exhaust air of the air-cooled fuel cell flowing through the heat-exchanger duct;
    wherein the controller selectively varies the heating system by pivoting the heat-exchanger door.

2. The system of claim 1,
    wherein a cross-sectional area of the heat-exchanger duct is equal to a cross-sectional area of the inlet duct.

3. The system of claim 1,
    wherein a cross-sectional area of the heat-exchanger duct is unequal to a cross-sectional area of the inlet duct.

4. The system of claim 1, wherein the heating system further comprises:
    an electric heater;
    wherein the supply air flows through the electric heater before entering the air-cooled fuel cell.

5. The system of claim 1, wherein the heating system comprises:
    an electric heater;
    a heater housing; and
    an electric fan configured to draw the supply air through the heater housing;
    wherein the supply air flows through the electric heater before entering the air-cooled fuel cell; and
    wherein the controller selectively varies the heating system by pivoting the heat-exchanger door and by varying a current to the electric heater.

6. The system of claim 5,
    wherein the heater housing is removable from the rotorcraft.

7. The system of claim 1, wherein the heating system further comprises:
    an electric heater;
    wherein the supply air flows through the electric heater before entering the air-cooled fuel cell; and
    wherein the controller selectively varies the heating system by varying a current to the electric heater.

8. The system of claim 1, further comprising:
    a valve configured to vary a pressure of the supply air.

9. An air-cooled fuel cell freeze protection system for a rotorcraft, comprising:
    a controller;
    an air-cooled fuel cell configured to be provided supply air from an inlet duct of the rotorcraft; and
    a heating system configured to heat the supply air and comprising:
        an electric heater;
        a heater housing;
        an electric fan configured to draw the supply air through the heater housing;
    wherein the supply air flows through the electric heater before entering the air-cooled fuel cell;
    wherein the controller selectively varies the heating system by varying a current to the electric heater.

10. The system of claim 9,
    wherein the heater housing is removable from the rotorcraft.

11. The system of claim 9, further comprising:
    a butterfly valve configured to vary a pressure of the supply air;
    wherein the controller selectively varies the butterfly valve.

12. The system of claim 9, wherein the heating system further comprises:
    a heat exchanger;
    a heat-exchanger duct; and
    a heat-exchanger door;
    wherein the heat exchanger is heated from exhaust air of the air-cooled fuel cell flowing through the heat-exchanger duct;
    wherein a cross-sectional area of the heat-exchanger duct is equal to a cross-sectional area of the inlet duct; and
    wherein the controller selectively varies the heating system by pivoting the heat-exchanger door.

13. The system of claim 9, wherein the heating system further comprises;
a heat exchanger;
a heat-exchanger duct; and
a heat-exchanger door;
wherein the heat exchanger is heated from exhaust air of the air-cooled fuel cell flowing through the heat-exchanger duct;
wherein a cross-sectional area of the heat-exchanger duct is unequal to a cross-sectional area of the inlet duct; and
wherein the controller selectively varies the heating system by pivoting the heat-exchanger door.

14. The system of claim 9, further comprising:
a butterfly valve configured to vary a pressure of the supply air;
wherein the heating system comprises:
a heat exchanger;
a heat-exchanger duct; and
a heat-exchanger door;
wherein the heat exchanger is heated from exhaust air of the air-cooled fuel cell flowing through the heat-exchanger duct;
wherein a cross-sectional area of the heat-exchanger duct is equal to a cross-sectional area of the inlet duct;
wherein the controller selectively varies the butterfly valve; and
wherein the controller selectively varies the heating system by pivoting the heat-exchanger door.

15. The system of claim 9, further comprising:
a butterfly valve configured to vary a pressure of the supply air;
wherein the heating system comprises:
a heat exchanger;
a heat-exchanger duct; and
a heat-exchanger door;
wherein the heat exchanger is heated from exhaust air of the air-cooled fuel cell flowing through the heat-exchanger duct;
wherein a cross-sectional area of the heat-exchanger duct is unequal to a cross-sectional area of the inlet duct;
wherein the controller selectively varies the butterfly valve; and
wherein the controller selectively varies the heating system by pivoting the heat-exchanger door.

* * * * *